July 25, 1967

L. E. HUMPHREY ET AL 3,333,049

ALKALI METAL COMPOSITE ELECTRICAL CONDUCTORS

Filed Sept. 7, 1965

INVENTORS
LAURENCE E. HUMPHREY
GILBERT I. ADDIS
RAYMOND C. HESS

BY Robert C. Sullivan
ATTORNEY

United States Patent Office 3,333,049
Patented July 25, 1967

3,333,049
ALKALI METAL COMPOSITE ELECTRICAL
CONDUCTORS
Laurence E. Humphrey, Westfield, Gilbert I. Addis, Plainfield, and Raymond C. Hess, Westfield, N.J., assignors to Union Carbide Corporation, a corporation of New York
Filed Sept. 7, 1965, Ser. No. 485,485
24 Claims. (Cl. 174—102)

This application is a continuation-in-part of application Ser. No. 311,059, filed Sept. 24, 1963, now abandoned, which is a continuation-in-part of application Ser. No. 302,942, filed Aug. 19, 1963 also now abandoned.

This invention relates generally to electrical conductors and, more particularly, to a unique combination comprising an alkali metal conductor and as an insulation therefor an olefinic hydrocarbon polymer.

Heretofore, a wide variety of insulated electrical conductors have been made with a multitude of different constructions and materials. Commercial and technical considerations have dictated that the metallic conducting element in these conductors usually be of copper or aluminum. In various applications, notably in power transmission lines, inherent deficiencies of these conducting materials, such as age and work hardening and inherent rigidity were overcome by stranding the conductor metal, i.e., a bundle of finely drawn copper or aluminum conductors being twisted into a larger stranded conductor. However such stranding provides interstices which must be filled or covered with a semi-conductive material, normally referred to as strand shielding for high voltage applications. In spite of these elaborate requirements aluminum and copper have been the only metallic conductor materials which have attained wide commercial acceptance albeit acute shortages of these materials have existed.

Insulated electrical conductors have been proposed utilizing alkali metals as the metallic electrical conductor. Metallic sodium, as illustrative of the alkali metals, has been previously investigated as an electrical conductor and are described in detail in Transactions of Electrochemical Society, vol. 62, page 151, 1932. As noted in the cited article, although the specific resistance of solid sodium is about three times as great as that of copper, the specific gravity of sodium is about one-ninth that of copper. Thus for any given conductivity, a sodium conductor weighs only one third as much as an equivalent copper conductor. Despite the well recognized attraction of sodium as a conductor, it has not heretofore achieved commercial acceptance.

Since the alkali metals are extremely active elements, especially in respect to moisture and oxygen, and in addition have low tensile strength, they are of no practical use as electrical conductors unless encased in a protective and reinforcing casing. Although a number of different casings have been proposed, for alkali metal conducting members in the past, none has made the alkali metal conductor a practical success. For example, it has been proposed to encase the alkali metal in a metal tube which makes the resulting conductor heavy and relatively rigid and leads to costly and difficult fabrication because of the problems associated with the production of long and continuous lengths. Encasement metals such as iron or steel are impractical for carrying alternating current because of high eddy current losses, and increased self inductance. Metals such as lead are impractical as encasing members because they form brittle products with alkali metals at elevated temperatures.

Such metallic encasements have been proposed in such references as U.S. Patent 833,290 to A. B. Betts, dated Oct. 16, 1906, and French Patent 973,315 issued Feb. 9, 1951, to S. Cantacuzene. In this latter reference mention is made to the use of lead or an unspecified polymeric material as the encasement material which is insulated by an electrical insulation such as oil and paper and then jacketed. However, severe work hardening and alloying problems of lead and sodium make such encasements impractical.

More recently the use of oil impregnated paper wrappings as both insulator and protective element for alkali metal conductors has been proposed by Theodore de Koning in his book "The Cooling of Electrical Machines and Cables," published by the author, The Hague, Holland, Second Edition, 1957. Such conductors are inherently fragile. Wrappings tend to tear or slip on bending or elongation or to split under compression which leads to subsequent electrical breakdown and there is little flexibility to the encased or wrapped conductor.

Now in accordance with the present invention it has been discovered that a normally solid alkali metal electrical conductor electrically insulated and protected by a continuous covering of an inert flexible olefin hydrocarbon polymer having certain specific characteristics overcomes the many problems and deficiencies of the proposed prior art alkali metal conductors as well as many of the deficiencies of conventional composite electrical conductors. More specifically, the present invention is based on the finding that an alkali metal conductor encased in a continuous covering of certain well defined hydrocarbon polymers provides remarkable composite electrical conductors which are characterized by electrical, physical and chemical properties not heretofore known or realized. By way of illustration, the composite conductors of this invention provide a flexible solid unitary conductor, thereby eliminating the need for stranding heretofore oftentimes necessary to achieve flexibility. In addition it has been found that the composite conductors of the invention provide corona extinction voltages above that required for high voltage applications without the necessity of using semi-conducting strand shielding so necessary in present day practices. Moreover, our insulated conductors are flexible almost without regard to the dimensions of the conducting alkali metal core and are free of the inherent work hardening and aging effects associated with conventional conductors, thereby enabling these conductors to be manipulated and installed with heretofore unrealized facility. Furthermore, these insulated electrical conductors can be produced in a single simultaneous operation whereas the conductors of the prior art require a large number of separate and sequential operations. Further, these insulated conductors can be elongated to an extent greater than 500 percent without breaking (although the current-carrying capacity is thereby lowered) overcoming serious hazards which are involved in the use of prior art conductors. Some of our novel composite conductors can be elongated to up to 30 percent and effect substantially complete recovery, thus eliminating sudden cable breaks and the need to replace a cable which has become slightly stretched in installation, a characteristic which, as far as is known, has not been heretofore available.

The insulated electrical conductors can be drawn through sizing dies to effect simultaneous diameter reduction to both the insulation and the metal conductor. This unique attribute permits high speed production of a variety of small diameter insulated conductors without the necessity of handling or providing storage for exceedingly long lengths of assorted wire stocks, and further provides a substantial relative increase in tensile strength through orientation of the insulation.

It is particularly noteworthy that the composite electrical conductors of this invention are unexpectedly free of many hazards normally associated with alkali metals. For example, no additional special skills are required in the handling or installation thereof even though the conductor metal is chemically reactive. If the polymeric insulation is punctured or burned, to the extent of exposing the alkali metal core, limited action or reaction of the metal with its environment, whether it be air, water and the like, takes place, thus promptly revealing the location of the fault; but the damage is closely limited to the vicinity of the fault.

The polymers which are employed in combination with solid alkali metal to provide the remarkable electrical conductors of this invention are as indicated above olefinic hydrocarbon polymers and are characterized by inertness to alkali metal. They are further characterized by a tensile strength of at least 800 and preferably at least 2000 p.s.i., a flexural modulus of less than 200,000 and preferably less than 50,000 p.s.i., and a degree of water permeability of less than 3 grams and preferably less than 0.5 gram per 24 hours per 100 square inches of film per mil thickness (as measured in accordance with ASTM E–96–53T/Procedure E). In high voltage applications the polymers may be additionally characterized by a dielectric strength greater than 450 volts per mil, and preferably greater than 500 volts per mil, as well as dissipation factor less than 0.001 at 60 cycles, and preferably less than .0003 at 60 cycles, and a dielectric constant less than 3.0 and preferably less than 2.5.

Those polymers which are characterized by the above properties and which are useful in the practice of our invention are produced as far as is known only by the polymerization of one or a mixture of mono-olefinic hydrocarbons containing from two to four carbon atoms. Typical of such polymers and copolymers are the low, medium and high density polyethylene as well as polypropylene and ethylene-propylene copolymers and the like. Such copolymers useful in this invention should contain more than 50 percent polymerized ethylene or propylene. They can however contain amounts less than 50 percent of other copolymerized hydrocarbon monomers such as pentene, hexene and the like. Of course mixtures of two or more of such polymers and copolymers in the form of blends can be employed. Best results to date have been obtained with a polyethylene having the above-referred to properties and having a density of from about 0.91 to about 0.96. Particularly preferred copolymers are the ethylene copolymers such as ethylene-propylene copolymer and ethylene-neo-hexene copolymer.

For some conditions of use of the conductor, butene polymers such as polybutene, butene-hexene copolymer and the like can also be used in place of the ethylene or propylene polymers and can be considered under such circumstances to be equivalents of such polymers in the practice of this invention.

It will be appreciated that the specific hydrocarbon polymers employed as the insulation for our composite electrical conductors can contain minor amounts of one or more additives to modify the properties thereof without materially detracting from the remarkable characteristics thereof. For example, minor amounts of polar polymeric materials such as the ethylene-vinyl acetate or ethylene-ethyl acrylate copolymers can be blended with the hydrocarbon polymers referred to above to provide specific improvements in low temperature flexibility, impact resistance, stress cracking and the like. For the most part such materials are added in an amount of up to about 4% by weight of the hydrocarbon polymer, although amounts of such additives up to about 15% by weight of the hydrocarbon polymer can sometimes be employed with good results. According to our experience as the amounts of such additives progressively increase over and above about 15% by weight, they tend to proportionately detract from the desirable properties of our composite electrical conductor. Other additives such as pigments, stabilizers, anti-oxidants and the like can also be incorporated by blending within the specific hydrocarbon polymers referred to above without adversely affecting the insulating properties thereof or the electrical characteristics of the conductor provided such additives do not cause the composition to be reactive in respect to the alkali metal. In general, these latter additives are incorporated in the hydrocarbon polymer in amounts consistent with their well-known usage in the conventional art.

The alkali metals useful as electrical conductor metals in this invention are those having an atomic weight less than 40. Illustrative of such metals are lithium, sodium and potassium. Because of its ready availability, cost and properties, sodium is the preferred alkali metal for use in this invention. While such metals are known to be conductive in their fluid or molten state, the present invention is based in part on their use in a solid state. Preferred procedures for the production of the novel composite conductors provide for the use of molten metal in the processing thereof. In the practice of our invention I prefer to employ solid sodium as the conductive core of the composite electrical conductor.

Depending on environmental conditions involved as well as on the particular application concerned, the composite electrical conductors of our invention can readily be modified if desired to adapt them to unusual environmental or special service conditions. Thus, for example, barriers can be employed about the composite conductor to provide an added measure of resistance to oxygen and moisture permeation as well as a degree of added protection against physical damage to the hydrocarbon insulation. Similarly polymeric semi-conductive electrical shields can be employed about the solid conductor core as part of the conducting element or about the hydrocarbon polymer insulation of the composite electrical conductor.

Figure 1:
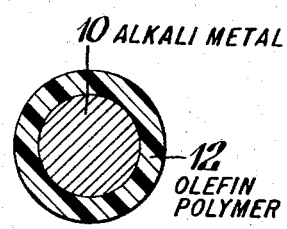
FIG. 1 represents a cross-sectional view of the simplest embodiment of a composite insulated electrical conductor of this invention.

With particular reference to the drawings, the essential components of our composite electrical conductors are depicted in a cross-sectional view in FIG. 1 and comprise a solid alkali metal core 10 insulated in or surrounded by a flexible inert polymer 12 of the hereinabove defined composition. Such conductors can be produced in varying sizes having practically any core diameter and insulation thickness necessary for its intended use by various procedures. One procedure could include the steps of preforming a hydrocarbon polymer of the type described as for example a polyethylene having a density of about 0.93 into tubular form, carefully feeding molten sodium into the tube through one end until the tube is filled and permitting the filled tube to cool to room temperature. However, best results have been obtained by an extrusion process of the type schematically depicted in FIG. 5. Referring to said figure and with continued reference to polyethylene and sodium as merely illustrative, pressurized molten polyethylene is fed from an extruder 20 through an annular orifice in a cross-head die 22, thereby forming extruded polyethylene tubing 12. Simultaneously with the extrusion of the tubing 12, pressurized molten sodium metal is fed from a fed tank 24 blanketed with an inert gas, through a circular central orifice in the cross-head die 22, thereby forming a molten sodium rod or wire 10 as it fills the extruded tubing 12 and solidifies on cooling. Since the thermoplastic resin and the sodium are extruded simultaneously both the resin and the sodium are in a molten state and in the absence of air when they are brought together and, as the molten metal is maintained under a pressure, the effects of shrinkage of the metal on solidification are overcome by constant filling with molten metal. This method of filling provides a void-free conductor. Negative pressure can also be employed in the practice of this process.

Figure 5:
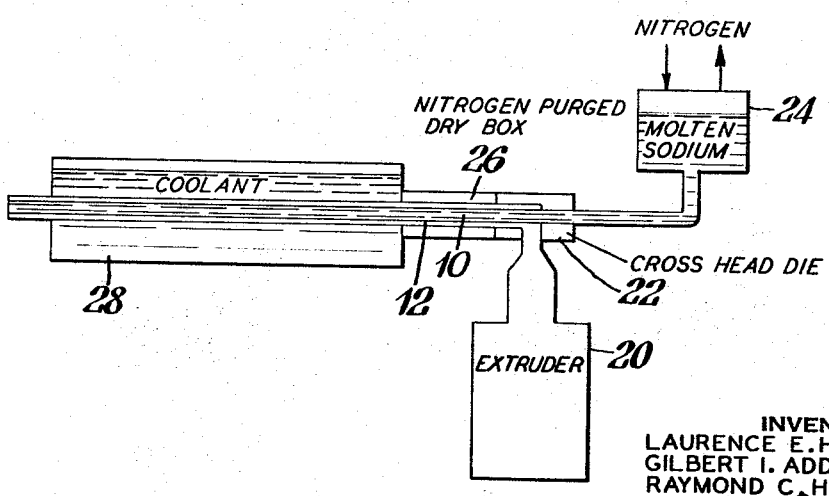
FIG. 5 is a schematic diagram of the preferred process by which the composite conductors of this invention can be prepared.

The dimensions of the composite conductor provided by the simultaneous extrusion process of FIG. 5, i.e., the diameter of the sodium rod or wire 10 and the thickness of the polyethylene insulation 12, can be controlled by adjusting a number of interdependent variables. For any given cross-head die, the main variables are the temperature and pressure of the molten resin, the temperature and pressure of the molten sodium, and the take-off speed or withdrawal rate of the composite conductor. In general, the diameter of the sodium wire 10 increases with increasing sodium pressures and with increasing sodium or resin temperatures. Similarly, the thickness of the insulation 12 decreases with any increase in the diameter of the sodium wire, and with increasing take-off speeds.

Thus it will be appreciated that, within limits, a variety of composite conductors can be made from a single extrusion die by merely modifying one or more process variables. The diameter and uniformity of the composite conductor may also be controlled by the use of sizing plates. Thus, all dimensions of the composite conductor as extruded can be readily controlled by adjusting one or more of the aforementioned variables.

From the cros-head die 22, the extruded composite conductor is passed through a dry box 26 (which may be filled with an inert gas, such as nitrogen) which prevents the die from being cooled by the coolant in the adjacent cooling bath 28, and provides a measure of safety in the event that a break occurs in the insulation 12 upon extrusion thereof. The dry box can be provided with a transparent cover or window to permit observation of the extrusion operation.

From the dry box 26, the composite conductor is passed through a liquid cooling bath 28 to set the insulation 12 and solidify the sodium wire 10. The cooling liquid is preferably an oil or other liquid which is inert to both the sodium and the insulation, as a safety precaution in case a break occurs in the insulation 12. The temperature of the cooling bath can be adjusted to provide adequate cooling in accordance with the temperature of extrusion, the length of the bath, the size of the conductor, the take-off speed, and the like. Of course, the cooling tank 28 may be replaced by any other suitable cooling means, such as gas cooling or a cooling belt contoured to fit the conductor.

During start-up of the process illustrated in FIG. 5 the thermoplastic material from the extruder 20 is initially extruded without the molten sodium until the desired extrusion rate and other operating conditions have been established and stabilized. During this start-up period, the thermoplastic insulation may be allowed to collapse as it emerges from the annular die orifice, thus forming a solid or nearly solid rod, or it may be maintained in the form of a tubing by feeding a pressurized gas through the central orifice of the die. After the desired conditions have been established, the flow of the molten sodium wire 10 within the insulation 12 is started. It is important that the molten sodium be continuously encased within the die 22 and the insulation 12 during the extrusion operation, to achieve a firm adherence between the conductor and insulation.

A unique characteristic of the composite electrical conductors of this invention is the extent to which the sodium conducting element and the surrounding polymer adhere to each other. This exceptional adhesion is obtained when the insulation polymer contacts the sodium metal and also when the outer surface of the conducting element is a semi-conductive polymer. For example, the sodium core of a composite electrical conductor, prepared by the process depicted in FIG. 5 and described above, cannot be pulled from or through the surrounding polyethylene casing. In addition, it has been found that such composite conductors can be uniformly drawn to smaller sizes with a corresponding uniform reduction in the diameter of the sodium core and in the thickness of the surrounding polyethylene casing. Since the sodium core and polyethylene casing of the drawn conductor exhibit much of the unique adhering phenomenon described above, it would appear that the strength thereof at or about the sodium-polyethylene interface is as great as the strength of the polyethylene itself and greater than that of the solid sodium core. Stated differently, it would appear that a force sufficient to deform the polyethylene casing and solid sodium rod of our composite conductor is not sufficient to destroy the adhering relationship of the two at or about their interface. The nature and strength of this adhering relationship tends to indicate that the polyethylene casing is firmly bonded to the solid sodium core. As far as is known this adhering relationship is not characteristic of conventional composite conductors.

The reasons why the composite electrical conductor of this invention is characterized by the unique adhering relationship between the alkali metal core and the hydrocarbon polymer casing are not fully known or completely understood. Visual examination of the cross-sectional specimen of our composite conductor and corona tests both show that the interface between the core and the casing was essentially free of voids, i.e. the outer surface of the core and the inner surface of the polymer casing are in intimate and apparently continuous contact.

Reduction in the diameter of our composite electrical conductors can be accomplished by various means, as for example, by applying tension to the composite conductor during its passage over one or more rolls. A preferred method includes the step of passing the composite conductor through one or more drawing or roller dies in one or more passes. An unexpected benefit of the latter method is the many-fold increase in the tensile strength obtained thereby when orientable hydrocarbon polymers are employed. The preferred orientable hydrocarbon polymer is polyethylene having a density of from 0.935–0.96. This increase in tensile strength is believed attributable to the molecular orientation of the hydrocarbon polymer insulation during the drawing operation.

Figure 2:
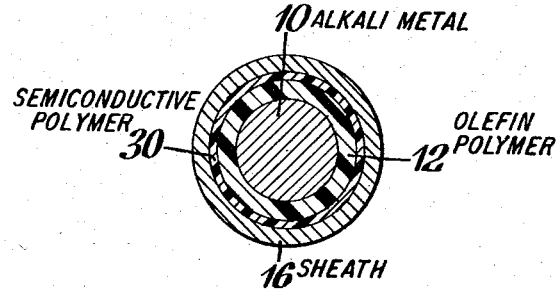
FIG. 2 represents a cross-sectional view of a further embodiment of a composite insulated electrical conductor of this invention wherein a metal barrier shield for which a ring of drain wires may be substituted is concentrically positioned about the insulation.

The composite conductor illustrated in the cross-sectional view of FIG. 2 is somewhat similar to that depicted in FIG. 1 in that the alkali metal conductor 10 is surrounded by olefin hydrocarbon polymer insulation 12 but with the exception that the insulation 12 is surrounded by a continuous annular layer of semi-conductive polymer 30 which is in turn surrounded by a metal sheath 16 or by drain wires (not shown).

The semi-conductive electrical shield 30 employed in the embodiments of this invention illustrated in FIG. 2 of the drawing generally comprises a carbon black filled polymer, preferably a carbon black filled polymer of the type employed as the insulation for our novel conductors. The capacity of such composition to be filled with carbon black can be enhanced by the use of such non-hydrocarbon polymers as vinyl acetate or ethyl acrylate polymer or copolymers thereof with one or more polymerizable hydrocarbons such as ethylene, propylene and the like in amounts by weight up to that of the hydrocarbon polymer itself.

The alkali metal conductor can, if desired, be immediately surrounded by a semi-conductive polymeric material. In such constructions the semi-conductive annular layer functions as part of the conducting element. When the semi-conducting conductor shield is used the insulation is applied directly to this shield and the same requirements of the insulation to conductor element apply as when the insulation is applied directly to the alkali metal conductor. For example, if the composite conductor is to be used in high voltage applications, the conductor element, in this case alkali metal surrounded by a semi-conductive layer, the latter must form an essentially void free interface with the insulation if the composite conductor is to be free of corona breakdown. However, because the semi-conductive layer is part of the conductor element it is not necessary that the interface between alkali metal and the semi-conductive polymer be void-free.

Those embodiments of this invention depicted in FIG. 2 of the drawing can be prepared by a modification of the process illustrated in FIG. 5 and described above. In the modified process a concentric multi-channel die is provided which permits extrusion of the semi-conductive polymeric material and the polymeric insulation in concentric tubular form. The number of channels and corresponding concentric orifices provided in the die determines the number of concentric layers of material which can be formed in the tubular extrudate. The polymeric material fed to the respective channels and orifices determines the particular structure of the extrudate. For example in the composite structure of FIG. 2, a two channel die is used wherein the semi-conductive polymeric material 30 is extruded from the exterior annulus of the die. The polymeric insulating material is extruded from the interior annulus of the die. As in most other cases the molten alkali metal is supplied to the tube from a channel in the center of the die. The adhesion produced between the alkali metal and a semi-conductive polymer is not of the same degree as that discussed above in respect to the adhesion between the molten sodium metal and the molten polyethylene insulation. On examination the latter interface has been found to be free of voids by both visual examination and corona tests.

The metallic insulation shield (or drain wires) is applied by conventional techniques in series or as a separate operation. Variations in the number of concentric layers of the composite conductors can be easily made by merely varying the number of channels and orifices of the die. The position of various polymeric materials in the structure of the composite conductor is determined by the particular orifice through which it is extruded.

Figure 3:
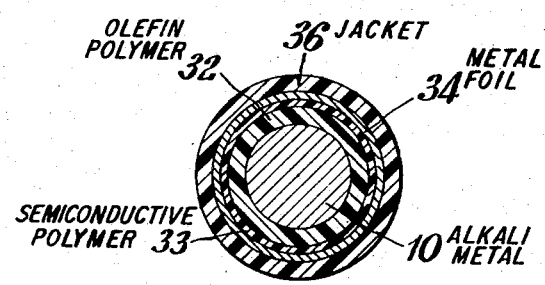
FIG. 3 represents a cross-sectional view of an embodiment of this invention which is especially useful in high voltage applications by providing for a relatively high corona inception voltage and consists of the composite conductor of FIG. 2 having a semi-conductor shield about the hydrocarbon insulation with a surrounding metal barrier or shield and an outer protective jacket.

In another specific embodiment of this invention illustrated in FIG. 3 the alkali metal rod 10 is continuously surrounded by a layer of flexible inert olefin hydrocarbon polymer insulation 32 and a layer of semi-conductive polymer 33. This composite structure is surrounded by a wrapping of metallic foil 34 which serves as both a ground shield and a moisture barrier and which is protected by a polymer jacket 36 which continuously covers it. This particular composite conductor can be prepared by the simultaneous extrusion of a composite tube of hydrocarbon polymer and semi-conductive polymer as discussed above which is simultaneously filled with molten sodium. The metallic foil 34 is wrapped about and in contact with the semi-conductive layer 33 of the same types of material discussed above and the foil is provided with a protective jacket 36 by a conventional extrusion cable coating apparatus. The protective jacket 36 can be any polymeric material capable of withstanding abuse.

Figure 4:
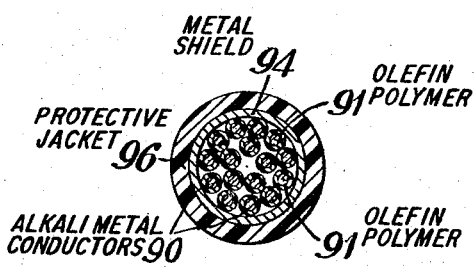
FIG. 4 represents a cross-sectional view of an embodiment of the invention in which a plurality of the composite electrical conductors of FIG. 1 are encased in a metal barrier or shield which in turn is surrounded by a protective jacket.

In FIG. 4 there is illustrated a modified embodiment of this invention employing a plurality of small alkali metal composite conductors 90 encased in olefin hydrocarbon polymer insulation 91 of the type discussed above, encased as an array within a metal shield 94 which is in turn surrounded by an outer protective jacket 96. This type of composite conductor may be produced by simultaneous extrusion of all the insulated conductors 90 and is especially useful in communications cable applications. The metal shield 94 and plastic jacket 96 can be provided by conventional means well known to the art.

In the examples which follow and throughout this specification, unless otherwise indicated, properties are determined by the following tests and measured in the indicated units.

Melt index (measured in decigrams per minute)—
A.S.T.M. D–1238 57T
Tensile strength (measured in pounds per square inch)—
A.S.T.M. D–412
Flexural modulus (measured in pounds per square inch)—
A.S.T.M. D–790
Moisture permeability (measured in grams per 24 hours per 100 square inches of film per mil thickness)—
A.S.T.M. E–96–53T/Procedure E The following examples serve to illustrate this invention and provide comparison with the prior art composite conductors and materials.

The resins employed in the examples and their properties were as follows:

|  | Resin Designation | | |
|---|---|---|---|
|  | DFD-6603 | DGD-4300 | EJE-103 |
|  | Resin type | | |
|  | Polyethylene | Polyethylene | Polypropylene |
| Density | 0.920 | 0.950 | 0.902 |
| Melt Index | 0.2 | 0.25 | 1.5 |
| Tensile Strength | 2,400 | 3,400 | 4,900 |
| Flexural Modulus | 43,000 | 160,000 | 165,000 |
| Moisture Permeability | 1.4 | 0.3 | 0.6 |

These resins where used are referred to by designation for convenience.

Polyethylene resin DFD–6603 was extruded through an annular orifice having an inside diameter of ¼ inch and an outside diameter of ½ inch. The resin was extruded at a low rate at a temperature of 130° C. (temperature in die). The molten sodium was fed into the extruded molten plastic tubing through a hollow pin in the cross-head die at a temperature of 112° C. From the extrusion die, the resulting polyethylene insulated sodium conductor was passed through a dry box, and then on through a cooling bath of highly reacted polypropylene glycol diether. The cooling bath was maintained at a temperature of 25° to 27° C.

The dimensions of the sodium wire and the polyethylene insulation were controlled by adjusting the take-off speed and the pressure of the molten sodium as shown in the following tables. In the table. "AWG" means American Wire Gauge. These composite conductors are as illustrated in FIG. 1 of the drawings.

TABLE I

| Sodium Diameter (inch) | Approximate Equivalent Copper Wire Size (AWG) | Polyethylene Thickness (inch) | Sodium Pressure (inches of liquid having specific gravity of 1.0) | Take-O Speed/min. |
|---|---|---|---|---|
| .263 | | .054 | 17.1 | 6'2½" |
| .184 | #9 | .048 | 11.3 | 6'7½" |
| .167 | #10 | .032 | 14.6 | 11'4⅝" |
| .261 | #6 | .044 | 18.2 | 5'4⅜" |
| .222 | #8 | .095 | 7.5 | 3'3⅜" |
| 1.250 | #6 | .046 | 14.0 | 7'10" |
| .064 | #19 | .013 | 6.8 | 70' |

[1] DMD-4300 polyethylene resin.

Samples of the above conductors were sliced longitudinally for examination of the internal structure. The sodium was found to have filled the polyethylene tube completely and uniformly with no voids whatever. Also, the sodium and polyethylene were adhered to the extent that attempts to remove the polyethylene casing resulted in breaks in the sodium rather than at the sodium-polyethylene interface.

In a similar manner to that described above a sodium conductor cable was made utilizing EJE–103 polypropylene resin as the insulation material. The composite conductor had the following specifications:

|  | Inch |
|---|---|
| Outside diameter | .088 |
| Wall thickness | .018 |
| Sodium conductor diameter | .052 |

The polypropylene resin was extruded at a low rate at a temperature of 206° C. The molten sodium was fed into the extruded plastic tubing through a hollow pin in the cross head die at a temperature of 108° C. and a pressure of 9.8 inches of sodium. The take-off speed was 112 feet per minute. The apparatus and other conditions of the preparation were as set forth above. Similarly, samples of the polypropylene jacketed conductors were sliced longitudinally for examination of internal structure and were also found to be completely and uniformly filled with sodium with no voids whatever. The adhesion of the sodium to the polypropylene was similar to that experienced with the polyethylene.

A sample of the DFD–6603 polyethylene-insulated sodium conductor was tested for flexibility by measuring the load required to bend the center of a 2.5-inch unsupported section of a conductor a distance of 0.025 inch. The same test was also conducted on empty polyethylene tubes of identical size and on a No. 4 copper conductor insulated with a flexible vinyl compound.

The results of these tests are shown in Table II.

TABLE II

| Test Item | Insulation | | Equivalent AWG Wire Size [1] | Loads in Pounds |
|---|---|---|---|---|
| | Material | Thickness, mils | | |
| No. 4 Copper wire (7 strands .0772" dia.). | Flexible vinyl | 50 | | 10.8 |
| Sodium filled tube having a sodium diameter of 0.263 inch. | Low density polyethylene. | 52 | 4 | 2.0 |
| Empty tube (same as above) | do | 52 | 4 | 1.0 |

[1] Based on approximate equivalent AWG wire size.

As can be seen from the above data, the sodium-filled polyethylene tube was substantially as flexible as the same tube when empty. Moreover, the sodium-polyethylene conductors were considerably more flexible than the equivalent copper conductor insulated with a flexible vinyl compound. When the sodium was encased in a high density resin, the deformation load was 8.2 pounds vs. 8.0 pounds empty.

In another example of the invention, a low density polyethylene insulated sodium conductor having the structure illustrated in FIG. 1 of the drawings was tested for low temperature flexibility. The insulated conductor had the following dimensions:

|  | Inch |
|---|---|
| Outside diameter | 0.367 |
| Conductor diameter | 0.263 |
| Wall thickness | 0.052 |

The polyethylene used was DFD–6603.

In this test the composite conductor was held at a temperature of −40° C. for a period of three hours and then immediately flexed through 180° ten times in alternating directions. No cracking appeared in either the sodium or the insulation.

In further examples, sodium-filled polyethylene (density of 0.9334) tubes having a wall thickness of 0.036 inch, an inside diameter of 0.312 inch and an outside diameter of .384 inch were measured for electrical resistance and then immersed in water. The resistance of the conductors was unchanged after two years of continuous immersion.

A sodium-filled polyethylene tube was prepared and tested for A-C and D-C resistance. The A-C resistance at 60 cycles was found to be the same as the D-C resistance. The composite conductor was then surrounded by an iron pipe, and the A-C resistance was found to increase by a factor of at least five.

In another test, holes of varying size up to 0.15-inch diameter were drilled through the wall of a polyethylene insulated sodium conductor, partly penetrating the sodium. The punctured portion of the conductor was then vertically immersed in water. When the holes were cleaned and scraped with a wire while under water, hydrogen evolution took place from the larger holes. However, even with the largest hole, the reaction gradually subsided after the wire was removed. Subsequent cutting of the conductor revealed a layer of oxide or hydroxide over the exposed sodium, which prevented further reaction. Of course, the punctured conductors fail electrically, but the test was significant from a safety standpoint in that the reaction was limited to the exposed area and was self-terminating.

To illustrate the embodiment of the invention wherein a composite conductor of relatively large diameter (or cross-section) was reduced to smaller diameter the following examples and data are cited.

An extruded conductor comprising a sodium conductor 0.108 inch in diameter insulated with polyethylene DGD–4300 was produced by the method illustrated in FIG. 5. The outside diameter (O.D.) of the composite conductor was originally 0.179 inch, and the wall thickness of the insulation was 0.035 inch.

About 500 feet of this conductor was passed in turn through a series of dies on a conventional wire drawing machine at a speed of about 400 to 600 feet per minute, the dies being graduated so as to achieve about a 20% reduction in cross sectional area in each pass. After passing through each die the conductor was measured and its tensile strength determined in conventional manner. In these tests it was observed that the diameter of the sample increased somewhat or recovered between the time it first passed through a die and the time its tensile strength was determined. In Table III the results of these tests are presented showing die sizes, outside diameter (O.D.) of the composite conductor at the time of tensile test, ultimate tensile strength in pounds per square inch and percentage elongation with respect to the original length.

TABLE III

| Sample No. | Die Diameter (inch) | Insulation Cross Section in Sq. In. | O.D. (inch) | Tensile Strength (p.s.i.) | Elongation (percent) |
|---|---|---|---|---|---|
| Original | None | .0160 | 0.179 | 2,550 | None |
| A | 0.153 | .0133 | 0.1625 | 3,060 | 21 |
| B | 0.1369 | .0125 | 0.1575 | 3,290 | 29 |
| C | 0.1229 | .0102 | 0.143 | 4,130 | 59 |
| D | 0.1091 | .00644 | 0.113 | 6,580 | 151 |
| E | 0.0974 | .00525 | 0.102 | 9,089 | 209 |

It will be noted from the data in Table III that the strength of the conductor was improved nearly four-fold while it was elongated to three times its original length and its diameter was reduced to about 40 percent of original.

In another example another length of the feed-stock composite conductor described above was passed through the same dies used in the previous examples arranged in series, the conductor being fed through one die into the next at an overall speed of about 78 feet per minute. The outside diameter of the conductor (Sample F) was reduced from 0.179 inch to 0.1015 inch and its tensile strength was raised from 2550 p.s.i. to 9750 p.s.i. while it elongated 211 percent.

In a third example another sample of feed-stock composite conductor of the type used in the two previous examples was passed through the same dies in series at a speed of about 345 to 366 feet per minute. It was observed that at these speeds the conductor is appreciably warmed by friction and that some stretching of the conductor occurred after it left the last die. The diameter of the sample (Sample G) after reduction was 0.0635 inch; it elongated 695 percent as compared to the original, and its tensile strength was raised from 2550 p.s.i. to 41,100 p.s.i. indicating that substantial orientation of the insulation had taken place.

In another example a feed-stock composite conductor sodium .082 inch in diameter, insulation of 0.044 inch wall thickness of the same polyethylene used in the above examples and of 0.170 inch outside diameter was passed through the same series of dies at a speed of 354 to 385 feet per minute. Again frictional heating occurred. The outside diameter of the conductor (Sample H) was reduced to 0.0665 inch; its tensile strength increased from 2520 p.s.i. to 28,700 p.s.i. and it elongated 552 percent.

In a fifth example a feed-stock composite conductor of sodium having a conductor diameter of 0.033 inch, insulated with a low density polyethylene having a wall thickness of 0.017 inch was used. The polyethylene insulation was DFD–6603.

The feed-stock was passed through individual dies at 690 feet per minute. The test results are set forth in Table IV below:

TABLE IV

| Sample No. | Die Diameter (inch) | Insulation Cross Section in Sq. In. | O.D. (inch) | Tensile Strength (p.s.i.) | Elongation (percent) |
|---|---|---|---|---|---|
| Original | None | .00276 | 0.067 | 3,500 | None |
| J | 0.054 | .00221 | 0.060 | 4,060 | 25 |
| K | 0.050 | .00196 | 0.0565 | 4,600 | 40 |

Additional tests on Samples G and H have shown that the tensile modulus was raised from 66,200 p.s.i. to 238,000 p.s.i. in the case of Sample G and from 86,000 to 191,000 p.s.i. in the case of Sample H. Moreover the breaking strength of these conductors after elongation was substantially greater than that of bare and conventionally insulated copper wires of comparable size as shown in Table V.

TABLE V

| Sample | Wire Diameter (inch) | O.D. (inch) | Break Strength, Pounds |
|---|---|---|---|
| #18 Copper Bare | 0.041 | 0.041 | 49 |
| Sample G (from above) polyethylene insulated sodium | 0.041 | 0.067 | 83.9 |
| #20 Copper Bare | 0.031 | 0.031 | 29 |
| #20 Copper Insulated | 0.031 | 0.094 | 39.7 |
| Sample H | 0.032 | 0.066 | 72.5 |

It will be observed from the above data that this method whereby the cross section of the insulated conductor is reduced not only provides a commercially attractive way of producing composite sodium conductor of small diameter but also makes possible the production of such conductors that are significantly stronger than comparable copper conductors. Indeed, in conductors so produced the insulation may be the tensile or load-carrying member in contrast to conventional insulated copper or aluminum conductors wherein the metal is the tensile member.

Experiments were conducted to determine the corona extinction voltage of polyethylene insulated sodium conductor and to also determine the effect blending the cable has on the corona extinction voltage.

A thirty foot length of cable having the following specifications was evaluated:

CABLE 1

Cable rating _____ 15 kv.
Sodium conductor _____ 0.500 inch in diameter.
Semi-conductor
  strand shield _____ Extruded polyethylene containing carbon black 0.030 inch thickness.
Polyethylene insulation __ 0.220 inch wall thickness.
Return conductor _____ Semi-conducting paint, tinned copper mesh braid, insulated with polyethylene tape.

The polyethylene resin used as the insulation was DFD–6603.

This cable was fitted with a premolded stress cone at each end. The corona level was determined by increasing the voltage until corona occurred, and then decreasing the voltage until the last trace of corona vanished and recording that voltage as the extinction voltage.

After this determination had been made the cable was wrapped its full length around a drum of approximately twenty-four inches in diameter. The cable was then uncoiled from the drum and rewound with the opposite side of the cable adjacent to the drum. Two additional bends were made in the same manner. The total bending on the cable was two complete "bends" in each direction. The corona extinction voltage was then remeasured.

A forty foot sodium conductor insulated with polyethylene and utilizing no semi-conductor strand shield was evaluated in a similar manner except that the cable was wrapped about a 15 inch diameter drum instead of a twenty four inch diameter drum.

This cable had the following specifications:

CABLE 2

Cable rating _____ 15 kv.
Sodium conductor _____ 0.500 inch diameter.
Polyethylene insulation __ 0.220 inch wall thickness.
Return conductor _____ Approximately 30 mils of semi-conductive polyethylene/carbon black and copper mesh wrapped with polyethylene tape.

The polyethylene used as the insulation was DFD–6603. The results of these evaluations were as follows:

|  | Original Corona Extinction Voltage (kv.) | After Bending Corona Extinction Voltage (kv.) |
|---|---|---|
| Cable 1.—Sodium conductor cable with semi-conductive polyethylene in contact with sodium conductor as strand shield-illustrated in Fig. 2 of the drawings | 20 | 20 |
| Cable 2.—Sodium conductor cable with polyethylene insulation in contact with conductor metal—no semi-conducting strand shield-illustrated in Fig. 1 of the drawings | 28 | 26 |

The standards established by the Insulated Power Cable Engineering Association require the use of a semi-conducting strand shielding for high voltage aluminum and copper conductor cables and specify a minimum corona extinction level of 9.5 kv. for a 15 kv. design capacity cable. In view of the foregoing results this requirement clearly would not be essential with our composite conductors.

Additionally by way of comparison a copper conductor having an effective nylon semi-conductive strand shielding and insulated with polyethylene designed for 15 kv. exhibits a corona extinction voltage of about 14.5 kilovolts. A similar copper conductor provided with an ineffective semi-conductive strand shield, i.e., essentially without strand shielding identically insulated with polyethylene exhibited a corona extinction voltage of from about 4.5 to 5.0 kilovolts.

A comparison of the results of this experiment clearly indicate that the cable constructions of this invention do not require semi-conductive strand shielding as do copper and aluminum although this shielding can if desired be used. It is also apparent that the subject cable constructions are clearly in excess of the minimum industry standards with or without strand shielding, for the designed capacity of the composite conductor.

To further evaluate insulating materials a commercial cable coating composition of polyvinyl chloride plasticized with dioctyl phthalate was used to insulate a sodium conductor cable. In this experiment the plasticized polyvinyl chloride insulation was co-extruded around the molten sodium conductor as described in this specification. The insulation and metal presented a molten interface. This cable was extruded directly into a dry box and was then passed into a cooling trough filled with circulating oil. At the end of the trough the cable was wiped dry and wound on a spool. The sodium conductor had an average diameter of 450 mils with an average insulation wall thickness of about 200 mils making a total diameter of 850 mils.

It was noted that immediately on contact with the polyvinyl chloride the sodium conductor metal turned bright red. After cooling the sodium metal became gold in color and appeared mottled and pitted. The interface between the metal and insulation was very poor. The metal conductor was characterized by cracks and crevices in the surface. It is quite obvious that these defects make this insulation unsuitable for commercial use as an alkali metal electrical conductor insulation.

An evaluation was made on several sodium conductor cables to determine elastic and tensile properties. The cables evaluated were as follows:

*Cable 1.*—Sodium conductor having a 0.500 inch diameter and a polyethylene insulation having a wall thickness of 0.220 inch and an insulation shield of semi-conductive polyethylene of 0.030 inch. This cable was prepared by coextruding the molten sodium conductor, the molten polyethylene, and the molten semi-conductive polyethylene.

*Cable 2.*—A lead tube having a ⅛ inch wall thickness and a ½ inch outside diameter was filled with molten sodium. The filled tube was inserted in a ½ inch I.D. polyethylene tube with .220 inch wall and .030 inch outer semi-conductive shield and secured by means of pins inserted into holes.

*Cable 3.*—The lead tube of cable 2 filled with sodium metal but with no insulating packet.

The polyethylene resin used as the insulation was DFD–6603.

The cable samples were fitted with end grips and were mounted in a tensile testing device designed to stretch the sample at a constant rate. The grips were adjusted to provide a test segment of one linear inch.

Cable 1 was elongated to a span length of 1¹³⁄₁₆ inch or approximately 70 percent elongation. Upon release of tension the sample returned immediately to 1¼ inch or approximately 56 percent recovery. After about 20 hours relaxation the sample had recovered to 1³⁄₁₆ inch or approximately 62 percent recovery.

Cable 2 was elongated approximately 30 percent. Upon release of tension the polyethylene jacket retracted bending the uncompressable lead in a plane through its normal axis. When the lead-sodium conductor was cut open and the sodium was removed, a black deposit was found on the inner surface of the lead tube, indicating reaction of the lead with the sodium.

When cable 3 was elongated 20 percent the composite conductor yielded and exhibited no recovery upon release. At an elongation of thirty-five percent the composite conductor broke.

In order to determine the vulnerability of the sodium conductor cables insulated with a hydrocarbon polymer to fire two fifteen inch lengths of cable were prepared. This cable had a sodium conductor diameter of about 0.500 inch and a low density polyethylene insulation (0.92) having a wall thickness of about 0.220 inch. One length was placed in a horizontal position and a gas torch was applied to one end. The polyethylene took fire and remained burning while the torch was applied to the end but extinguished shortly after removal of the torch. The sodium metal did not take fire but formed an oxide and carbonate crust which protected the conductor metal from further reaction or dripping of molten metal.

The second 15 inch length of polyethylene insulated cable was supported in a vertical position and the lower end was ignited with a gas torch. Again a crust of oxide and carbonate formed over the conductor protecting it from further reaction or dripping. When the flame was removed, the polyethylene insulation extinguished itself after a short time.

Considering the low melting point of sodium metal it is believed quite surprising that the conductor metal did not flow from the insulation but rather sealed itself off by the formation of an oxide and carbonate crust.

Further evaluation of the sodium conductor cable of the present invention was made in respect to elongation under field conditions. Equivalent gauge copper cable was similarly evaluated by way of comparison.

In this experiment a standard No. 4 AWG 7 strand copper cable was compared with cable having 0.250 inch diameter sodium conductor both insulated with 0.075 inch of polyethylene (DFD–6603) under controlled stretch. The polyethylene resin used as the insulation of both cables was DFD–6603.

In this test 47.5 feet of the copper cable and 46.5 feet of sodium conductor cable were suspended between two buildings. Each cable in its turn was pulled downward by a fork lift truck through an anchored pulley.

After a vertical displacement of 12 feet or 12% the copper cable broke. After an elongation of approximately 30 percent or vertical displacement of 19.25 feet the sodium conductor cable was released and immediately recovered to six feet elongation and after a short recovery period this cable had recovered all but one foot, 11 inches or approximately 4.2 percent.

The test was repeated and the copper cable was carefully stretched to a displacement of 13 vertical feet (approximately 15 percent elongation) but upon release no recovery was noted. The sodium conductor cable was stretched to approximately 20 percent elongation and recovered immediately to 5 feet vertical displacement; and after 20 minutes to 3 feet vertical displacement. This cable was then again stretched to approximately 30 percent elongation and upon release immediately recovered to 7 feet vertical displacement and to five feet in ten minutes.

It is believed that the ability of the sodium conductor cable insulated with low density polyethylene to be stretched a reasonable amount and recover to its approximate original length is an extremely valuable attribute to a commercially usable cable and that this attribute is both unexpected and surprising.

A conduit test was conducted to evaluate the handling qualities of sodium conductor electrical cable insulated with polyethylene in comparison with copper conductor electrical cable insulated with plasticized polyvinyl chloride.

In this evaluation a 100 foot 2.5 inch conduit was assembled in the shape of a square having five twenty-foot sides and utilizing four standard elbows of 90°. The elbow radius was 10.5 inches and total elbow length was 18.6 inches. The total conduit pull including elbows was 106 feet.

The electrical cables evaluated had the following specifications.

| Inner Conductor | Sodium | #1 AWG-19 Strand Copper, | #2/0 AWG-19 Strand Copper |
|---|---|---|---|
| Diameter | 0.500 inch | 0.333 inch | 0.423 inch. |
| Insulation | 0.050 polyethylene.[1] | 5/64 polyvinyl chloride. | 5/64 polyvinyl chloride. |
| Approximate outside cable diameter | 0.600 inch | 0.500 inch | 0.590 inch. |
| Approximate weight in pounds/foot | 0.117 | 0.345 | 0.528. |
| Calculated maximum tension | 45 pounds | 118 pounds | 207 pounds. |
| Conduit fill factor | 19.5 percent | 12.3 percent | 18.8 percent. |

[1] Polyethylene resin DFD-6603.

In this test three lengths each of the test cables were held at the end by a Kellems grip. The three cables were then pulled into the conduit by means of a winch. The tension was measured by a spring balance scale attached between the winch cable and the Kellems grip. A No. 12 BWG (British Wire Gauge) steel wire was used to pull the cable through the conduit run. The cable was pulled at a rate of one inch in 5 seconds while taking tension readings otherwise at a higher rate.

The polyethylene insulated sodium cable was drawn through the conduit under 65 pounds tension; the #1 size copper conductor jacketed with plasticized polyvinyl chloride was drawn through the conduit under a tension of 380 pounds; and the 2/0 copper conductor jacketed with plasticized polyvinyl chloride required 560 pounds tension.

In this test the #2/0 copper cable jammed approximately four feet from the end of the conduit and would not move under 1100 pounds tension. The #1 copper cable required a tension of 450 pounds while the end was being drawn through the fourth 90° bend but only 380 pounds after passing through the bend.

It is believed that the facility of the low density polyethylene insulated sodium conductor cable to be drawn through a conduit under relatively low tension is a highly useful and unexpected attribute.

An evaluation was made on the sodium conductor cable insulated with the same low density polyethylene described in the preceding example to determine how it reacted electrically under stretch conditions. In this test a 20 foot length of polyethylene insulated sodium cable was fitted with Kellems grips spaced approximately 100 inch at the center of the sample. The ends of the cable were provided with a suitable copper contact for resistance measurements. The 100 inch center section was divided into five 20 inch sections by inked markings. The specimen was stretched between two posts by anchoring one of the Kellems grips to a post and by applying tension to the other grip by means of a winch secured to the other post. The electrical resistance of the conductor was measured at each step. The length of each of the 20 inch sections and the diameter of each section were measured for each 5 pound increase in tension. After reaching the limit of the 100 pound scale the tension was removed and measurements again made of the resistance and length. Resistance and length measurements were also made after approximately one hour and again after twenty hours. After approximately two weeks the resistance and length were again measured, the sample elongated further and resistance measurements made at each step. After approximately 50% elongation of the specimen the tension was again released and measurements again made immediately, after approximately one hour, and after approximately one day.

The results from this evaluation indicated that as the cable was elongated its electrical resistance increased and its outside diameter decreased. After a moderate elongation of 14.3 percent, the resistance increased 23 percent and the diameter decreased 6.7 percent. The cable length recovered immediately to 3.3 percent elongation and the resistance was 5 percent above the original. One and one-half hours after the tension had been released the cable length had recovered all but 1.7 percent in length and all but 0.2% in resistance. Length and resistance measurements made approximately two weeks after tension release indicated the specimen had recovered completely.

At a severe elongation of 48.2 percent the resistance increased 95 percent and the diameter decreased 18.5 percent. Upon release of tension the cable length and resistance recovered to 22.7 percent and 43 percent respectively above the original values. After about one hour the elongation was 16.8 percent and the resistance 27 percent above the original. After 20 hours recovery the elongation was 6.3 percent and the resistance was 11.4 percent higher than the original.

It is believed that the ability of the low density polyethylene insulated sodium conductor cable to recover after stretch, both physically and electrically is an exceedingly valuable attribute for a commercial electrical cable and that further this property is unexpected as standard copper and aluminum conductor cables are not known to exhibit this recovery phenomenon.

It will be appreciated that the polymeric compositions discussed above such as the hydrocarbon polymers, normally contain various stabilizers such as heat and ultra-violet stabilizers, anti-oxidants and the like, to provide protection to these polymers and polymeric compositions. These additives are used in very minor amounts and are used in the compositions discussed and exemplified herein which are normal commercial polymers and polymeric compositions.

Such additives generally have little or no effect upon the electrical or physical properties of the polymer and effect little or no activity with the sodium conductor metal in said polymeric compositions. To the extent they do not, they can be used.

While various specific embodiments of the invention have been illustrated and described in some detail, it will be understood that the same are susceptible of numerous modifications within the scope of the invention. For example, although the invention has been described with particular reference to solid sodium conductors, it will be apparent that the conducting member may have an annular cross-section. Moreover, additional layers of various materials may be added either inside or outside the composite conductor.

Although the invention has been described above with particular reference to extrusion of the various insulations around the metal conducting member, it will be understood that the composite conductor of the invention may be produced by a variety of other methods. For example, the insulation could be applied to a preformed sodium conductor by dip coating, by fluid bed coating, or by vapor deposition. Alternatively, as indicated above, the flexible insulation could be preformed and then filled with molten sodium.

It will be appreciated that these other methods are restrictive in that the continuous lengths which can be produced are limited and that the interface of metal to insulation may be inferior to that produced by the coextrusion technique which can produce a continuous unlimited length and which provides an exceptional interface between metal and insulation.

What is claimed is:

1. An electrical conductor having as essential components thereof (a) an electrically conductive member comprising a solid alkali metal core and (b) a flexible hydrocarbon polymer of a monoolefin having from 2 to 4, inclusive, carbon atoms electrically insulating and surrounding said conductive member with an initial firmly adhesive interface stronger than the solid alkali metal core, said flexible hydrocarbon polymer being substantially inert to the conducting member, exhibiting a tensile strength greater than 800 p.s.i., a flexural modulus than than 200,000 p.s.i., and a water vapor permeability of less than 3 grams per 24 hours per 100 square inches of film per mil thickness.

2. The electrical conductor of claim 1 wherein the alkali metal core is solid sodium metal.

3. The electrical conductor of claim 1 wherein the said hydrocarbon polymer is an ethylene polymer.

4. The electrical conductor of claim 3 wherein the ethylene polymer insulation is firmly adhered directly to the conductor metal.

5. The electrical conductor of claim 3 wherein the ethylene polymer is molecularly oriented along the longitudinal axis of the alkali metal core.

6. The electrical conductor of claim 1 wherein the said hydrocarbon polymer is an ethylene-propylene copolymer.

7. The electrical conductor of claim 1 wherein the said hydrocarbon polymer is propylene homopolymer.

8. The electrical conductor of claim 1 wherein the hydrocarbon polymer is an ethylene-hexene copolymer.

9. The electrical conductor of claim 1 wherein the hydrocarbon polymer insulation is firmly adhered directly to the conductor metal.

10. The electrical conductor of claim 1 wherein the hydrocarbon insulation is molecularly oriented along the longitudinal axis of the alkali metal core.

11. The electrical conductor of claim 1 wherin the hydrocarbon polymer insulation is firmly adhered to a semiconducting polymeric composition electrical shield about said alkali metal core.

12. The electrical conductor of claim 1 wherein the said hydrocarbon polymer is an ethylene homopolymer.

13. The electrical conductor of claim 12 wherein the alkali metal core is solid sodium metal.

14. The electrical conductor of claim 12 wherein the ethylene homopolymer insulation is firmly adhered directly to the conductor metal.

15. The electrical conductor of claim 10 wherein the ethylene homopolymer insulation is firmly adhered to a semi-conducting polymeric composition electrical shield about said alkali metal core.

16. The electrical conductor of claim 12 wherein the ethylene homopolymer is molecularly oriented along the longitudinal axis of the alkali metal core.

17. The electrical conductor of claim 16 wherein the ethylene homopolymer has a density of from 0.935 to 0.96 and the alkali metal core is solid sodium metal.

18. An electrical conductor comprising a conducting core of solid sodium metal, a flexible electrically semi-conducting polymeric composition inert to said sodium metal continuously surrounding the sodium metal and in direct contact therewith, and a flexible electrical insulation continuously surrounding and insulating said semi-conducting polymeric composition and being firmly adhered at the interface thereof, said interface being stronger than the solid sodium metal and said flexible electrical insulation being a hydrocarbon polymer of a monoolefin having from 2 to 4, inclusive, carbon atoms which is substantially inert to the conducting member, exhibiting a tensile strength greater than 800 p.s.i., a flexural modulus less than 200,000 p.s.i. and a water vapor permeability of less than 3 grams per 24 hours per 100 square inches of film per mil thickness.

19. The electrical conductor of claim 18 wherein the semi-conducting polymeric composition contains sufficient conductive carbon black to render said composition conductive to electric current.

20. The electrical conductor of claim 18 wherein the said flexible electrical insulating hydrocarbon polymer is an ethylene polymer.

21. The electrical conductor of claim 18 wherein the said flexible electrical insulating hydrocarbon polymer is an ethylene homopolymer.

22. The electrical conductor of claim 18 wherein the flexible semi-conducting polymeric composition is an ethylene polymer composition containing carbon black.

23. The electrical conductor of claim 18 wherein the flexible electrical insulation is continuously surrounded with a second coating of a flexible semi-conductive polymeric composition electrical shield.

24. The electrical conductor of claim 23 wherein both semi-conducting polymeric compositions are ethylene polymer based electrically semi-conducting compositions.

References Cited

UNITED STATES PATENTS

| | | |
|---|---|---|
| 2,712,384 | 7/1955 | Corneil. |
| 2,929,744 | 3/1960 | Mathes et al. |
| 3,098,893 | 7/1963 | Pringle et al. _____ 174—127 X |
| 3,100,136 | 8/1963 | D'Ascoli et al. |
| 3,110,623 | 11/1963 | Feild. |

FOREIGN PATENTS

| | | |
|---|---|---|
| 221,103 | 4/1959 | Australia. |
| 973,315 | 9/1950 | France. |
| 861,839 | 3/1961 | Great Britain. |
| 25,203 | 12/1901 | Switzerland. |

OTHER REFERENCES

Theodore de Konig: The Cooling of Electric Machines and Cables, published by the author, The Hague, Holland, Second Edition, 1957 (copyright date), pp. 203–229.

LARAMIE E. ASKIN, *Primary Examiner.*

UNITED STATES PATENT OFFICE

CERTIFICATE OF CORRECTION

Patent No. 3,333,049                          July 25, 1967

Laurence E. Humphrey et al.

It is hereby certified that error appears in the above numbered patent requiring correction and that the said Letters Patent should read as corrected below.

Column 17, line 41, for "than", second occurrence, read -- less --; column 18, line 6, for the claim reference numeral "10" read -- 12 --.

Signed and sealed this 3rd day of December 1968.

(SEAL)
Attest:

Edward M. Fletcher, Jr.                                     EDWARD J. BRENNER
Attesting Officer                                                    Commissioner of Patents